(12) United States Patent
Luo et al.

(10) Patent No.: US 11,889,540 B2
(45) Date of Patent: Jan. 30, 2024

(54) INTERFERENCE-AWARE SCHEDULING DURING TRANSITION INSTANCES IN AN INTEGRATED ACCESS AND BACKHAUL NETWORK

(71) Applicant: QUALCOMM Incorporated, San Diego, CA (US)

(72) Inventors: Jianghong Luo, Skillman, NJ (US); Navid Abedini, Basking Ridge, NJ (US); Tao Luo, San Diego, CA (US); Luca Blessent, Whitehouse Station, NJ (US); Junyi Li, Franklin Park, NJ (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/205,849

(22) Filed: Mar. 18, 2021

(65) Prior Publication Data
US 2021/0298036 A1    Sep. 23, 2021

Related U.S. Application Data

(60) Provisional application No. 62/992,117, filed on Mar. 19, 2020.

(51) Int. Cl.
*H04W 72/54* (2023.01)
*H04W 72/1273* (2023.01)
(Continued)

(52) U.S. Cl.
CPC ........... *H04W 72/54* (2023.01); *H04L 1/0003* (2013.01); *H04L 27/2607* (2013.01);
(Continued)

(58) Field of Classification Search
CPC ............. H04W 72/1226; H04W 16/28; H04W 72/1257; H04W 72/1273; H04W 88/14; H04L 1/0003; H04L 27/2607
See application file for complete search history.

(56) References Cited

U.S. PATENT DOCUMENTS

2019/0349079 A1   11/2019   Novlan et al.
2019/0394738 A1   12/2019   Abedini et al.
(Continued)

FOREIGN PATENT DOCUMENTS

CN   110536377 A   12/2019
CN   110649997 A   1/2020
(Continued)

OTHER PUBLICATIONS

Cewit: "Discussions on Resource Multiplexing Among Backhaul and Access Links", 3GPP TSG RAN WG1 Meeting #98bis, 3GPP Draft; R1-1911237 Resource Allocation IAB, 3rd Generation Partnership Project (3GPP), Mobile Competence Centre, 650, Route Des Lucioles, F-06921 Sophia-Antipolis Cedex, France, vol. RAN WG1, No. Chongqing, CN; Oct. 14, 2019-Oct. 20, 2019, Oct. 5, 2019 (Oct. 5, 2019), 10 Pages, XP051808884, Retrieved from the Internet: URL: https://www.3gpp.org/ftp/tsg_ran/WG1_RL1/TSGR1_98b/Docs/R1-1911237.zip, R1-1911237/R1-1911237 Resource AllocationIAB.docx—[retrieved on Oct. 5, 2019], Sections 3 and 4.

(Continued)

*Primary Examiner* — Jackie Zuniga Abad
(74) *Attorney, Agent, or Firm* — Sevan Savsa; ArentFox Schiff LLP

(57) ABSTRACT

An integrated access and backhaul (IAB) node may transition between use of a mobile termination (MT) function at the wireless device and use of a distributed unit (DU) function. The IAB node may schedule communication using the DU function of the wireless device based on whether one or more guard symbols are provided for an allocation from a parent node for the MT function.

20 Claims, 16 Drawing Sheets

(51) Int. Cl.
  *H04W 88/14* (2009.01)
  *H04L 27/26* (2006.01)
  *H04L 1/00* (2006.01)
  *H04W 16/28* (2009.01)
  *H04W 72/50* (2023.01)

(52) U.S. Cl.
  CPC ....... *H04W 16/28* (2013.01); *H04W 72/1273* (2013.01); *H04W 72/535* (2023.01); *H04W 88/14* (2013.01)

(56) References Cited

U.S. PATENT DOCUMENTS

| | | | | |
|---|---|---|---|---|
| 2020/0252847 | A1* | 8/2020 | Park | H04W 76/27 |
| 2021/0298036 | A1* | 9/2021 | Luo | H04L 27/2607 |
| 2022/0131729 | A1* | 4/2022 | You | H04L 5/0094 |

FOREIGN PATENT DOCUMENTS

| | | |
|---|---|---|
| WO | 2019242683 A1 | 12/2019 |
| WO | WO-2020202190 A1 * | 10/2020 |

OTHER PUBLICATIONS

International Search Report and Written Opinion—PCT/US2021/023168—ISA/EPO—dated Jul. 12, 2021.

Nokia., et al., "MAC CE for Guard Symbols Indication", 3GPP TSG-RAN WG2 Meeting #109-e, 3GPP Draft; R2-2000850, 3rd Generation Partnership Project (3GPP), Mobile Competence Centre, 650, Route Des Lucioles, F-06921 Sophia-Antipolis Cedex, France, vol. RAN WG2. No. Online; Feb. 24, 2020-Mar. 6, 2020, Feb. 13, 2020 (Feb. 13, 2020), 4 Pages, XP051848639, Retrieved from the Internet: URL: https://www.3gpp.org/ftp/tsg_ran/WG2_RL2/TSGR2_109_e/Docs/R2-2000850.zip, R2-2000850 MAC CE for Guard Symbols Indication.docx [retrieved on Feb. 13, 2020], Sections 1 and 2.

* cited by examiner

INTERFERENCE-AWARE SCHEDULING DURING TRANSITION INSTANCES IN AN INTEGRATED ACCESS AND BACKHAUL NETWORK

CROSS REFERENCE TO RELATED APPLICATION(S)

This Patent application claims priority to U.S. Provisional Application Ser. No. 62/992,117, filed on Mar. 19, 2020, entitled "INTERFERENCE-AWARE SCHEDULING DURING TRANSITION INSTANCES IN AN INTEGRATED ACCESS AND BACKHAUL NETWORK," and assigned to the assignee hereof. The disclosure of the prior Provisional Application is considered part of and is incorporated by reference in this Patent Application.

BACKGROUND

Technical Field

The present disclosure relates generally to communication systems, and more particularly, to an integrated access and backhaul (IAB) network.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects presented herein provide improvements for wireless communication that may be applicable to various multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an integrated access and backhaul (IAB) node. The apparatus may transition between use of a mobile termination (MT) function at the wireless device and use of a distributed unit (DU) function. The apparatus may schedule communication using the DU function of the wireless device based on whether one or more guard symbols are provided for an allocation from a parent node for the MT function.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
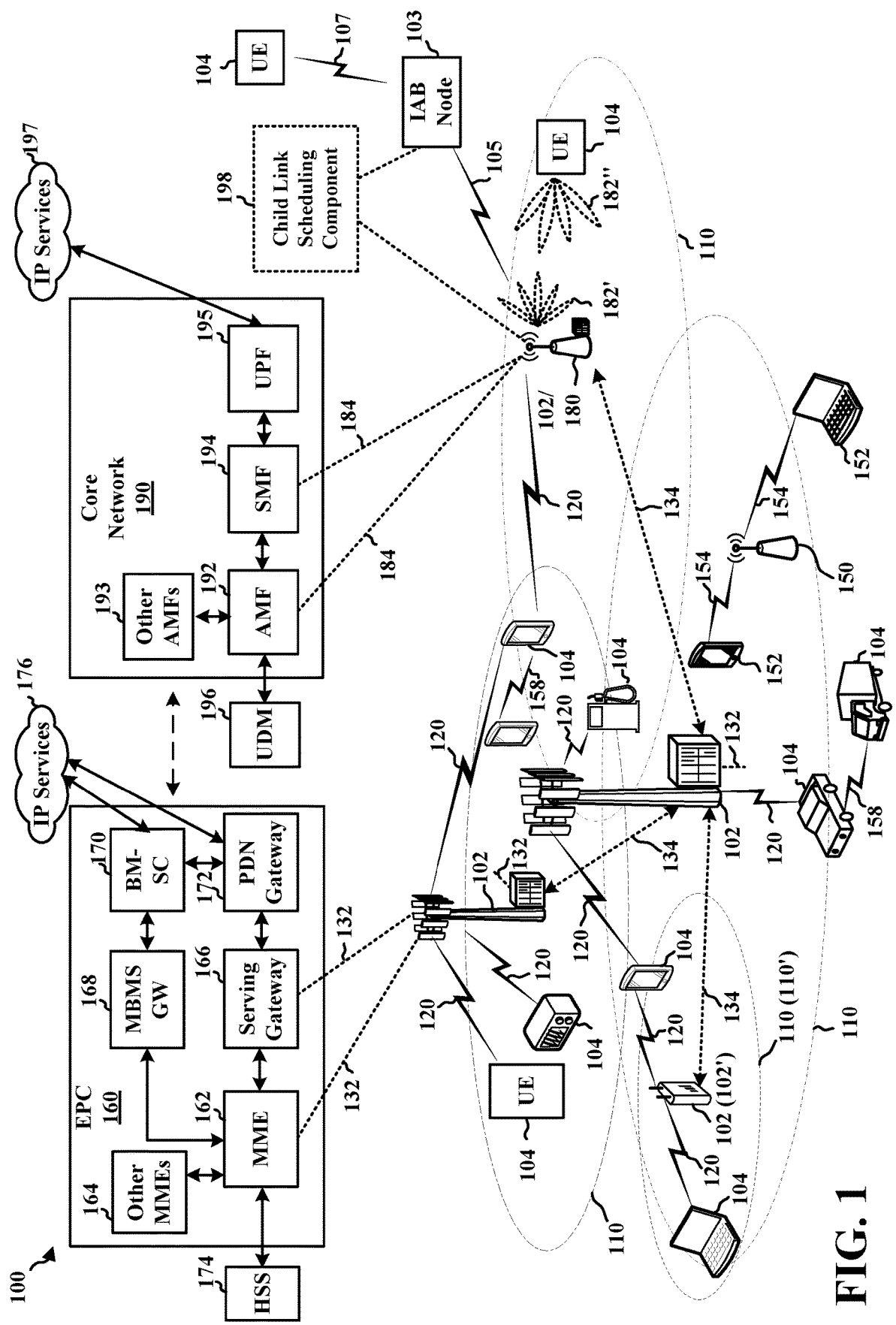
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 4:
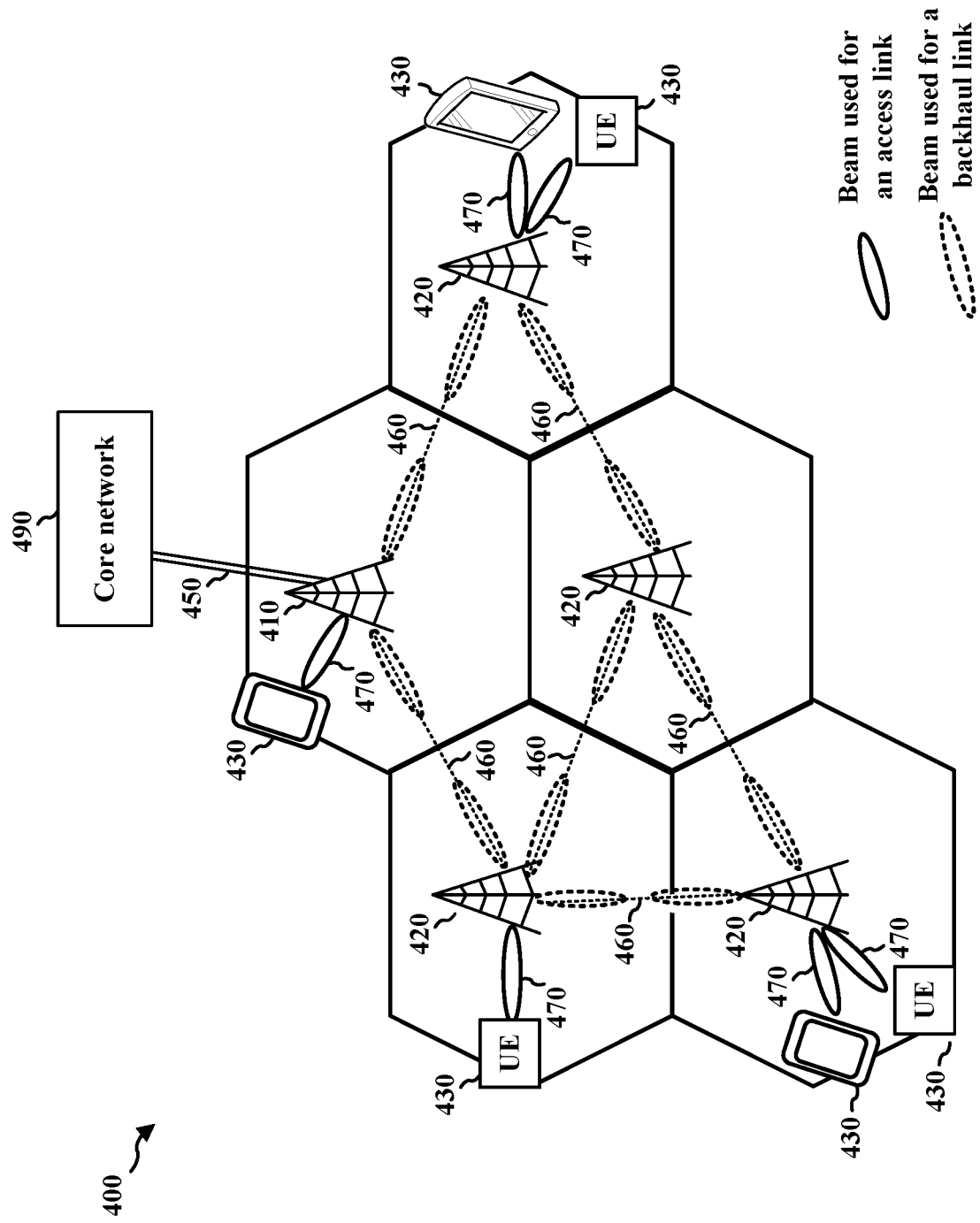
FIG. 4 is a diagram illustrating an IAB network.

FIG. 1 is a diagram illustrating an example of a wireless communications system and an access network 100. FIG. 1 illustrates that a communication system may include an IAB network that includes IAB nodes, such as an IAB node or an IAB donor. FIG. 4 illustrates an example IAB network. FIG. 1 illustrates a base station 102/180 as an IAB donor that provides a link to a core network, such as core network 190 or Evolved Packet Core (EPC) 160, to an IAB node 103 via a wireless backhaul link 105. Thus, the base station 102/180 may function as an IAB donor node to the IAB node 103. The IAB node 103 may provide a wireless access link 107 to one or more UEs 104 and/or to other IAB nodes, as described in connection with FIG. 4. The IAB node 103 may include a child link scheduling component 198 that schedules child link(s) based on whether guard symbols are provided for an allocation from a parent node. For example, the IAB node 103 may be configured to transition between use of a mobile termination (MT) function and use a distributed unit (DU) function. The child link scheduling component 198 may schedule communication using the DU function based on whether guard symbol(s) are provided for an allocation from a parent node (e.g., base station 102/180) for the MT function of the IAB node 103. Although the following description may be focused on 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an EPC 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) have extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
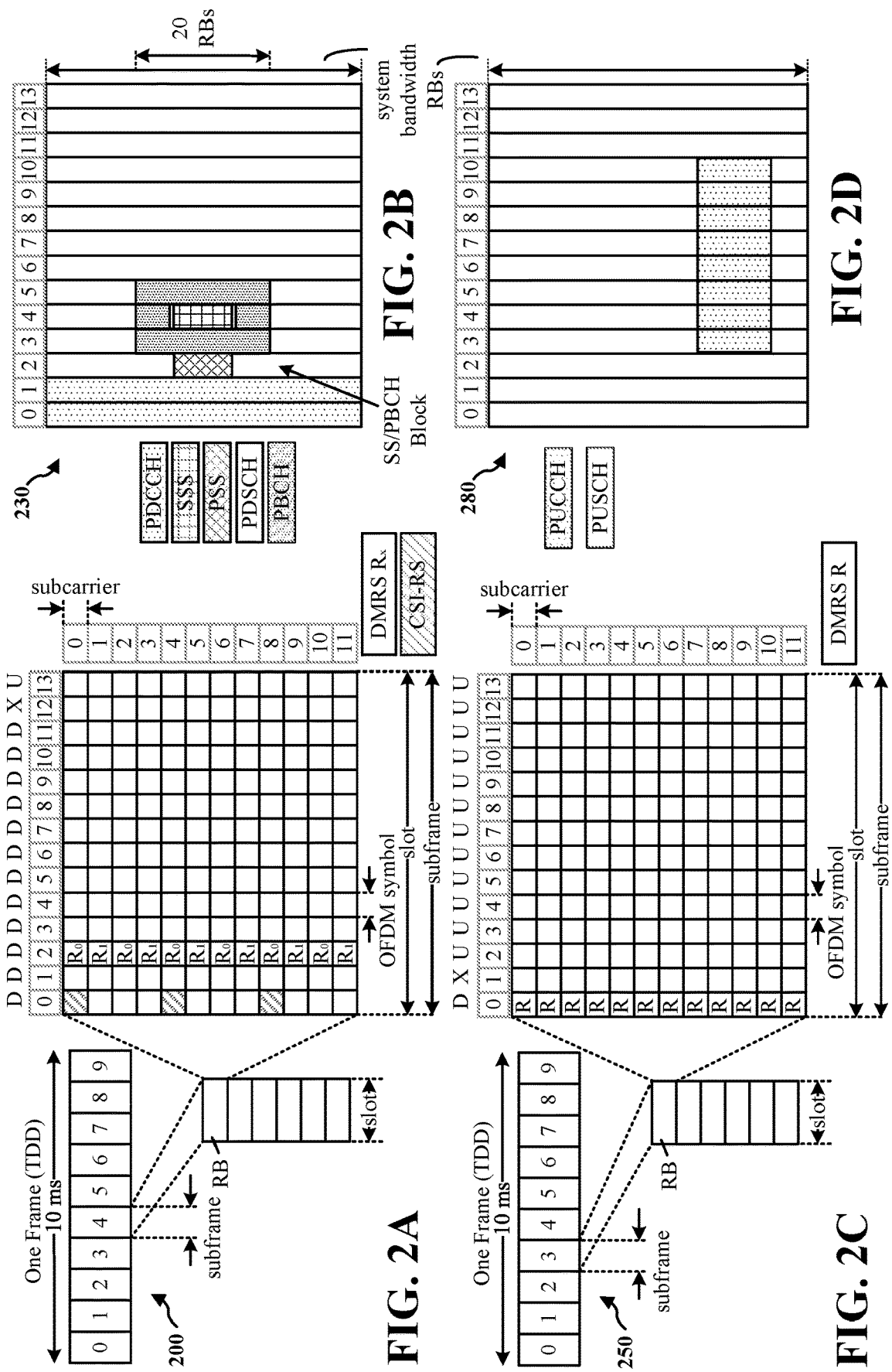
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
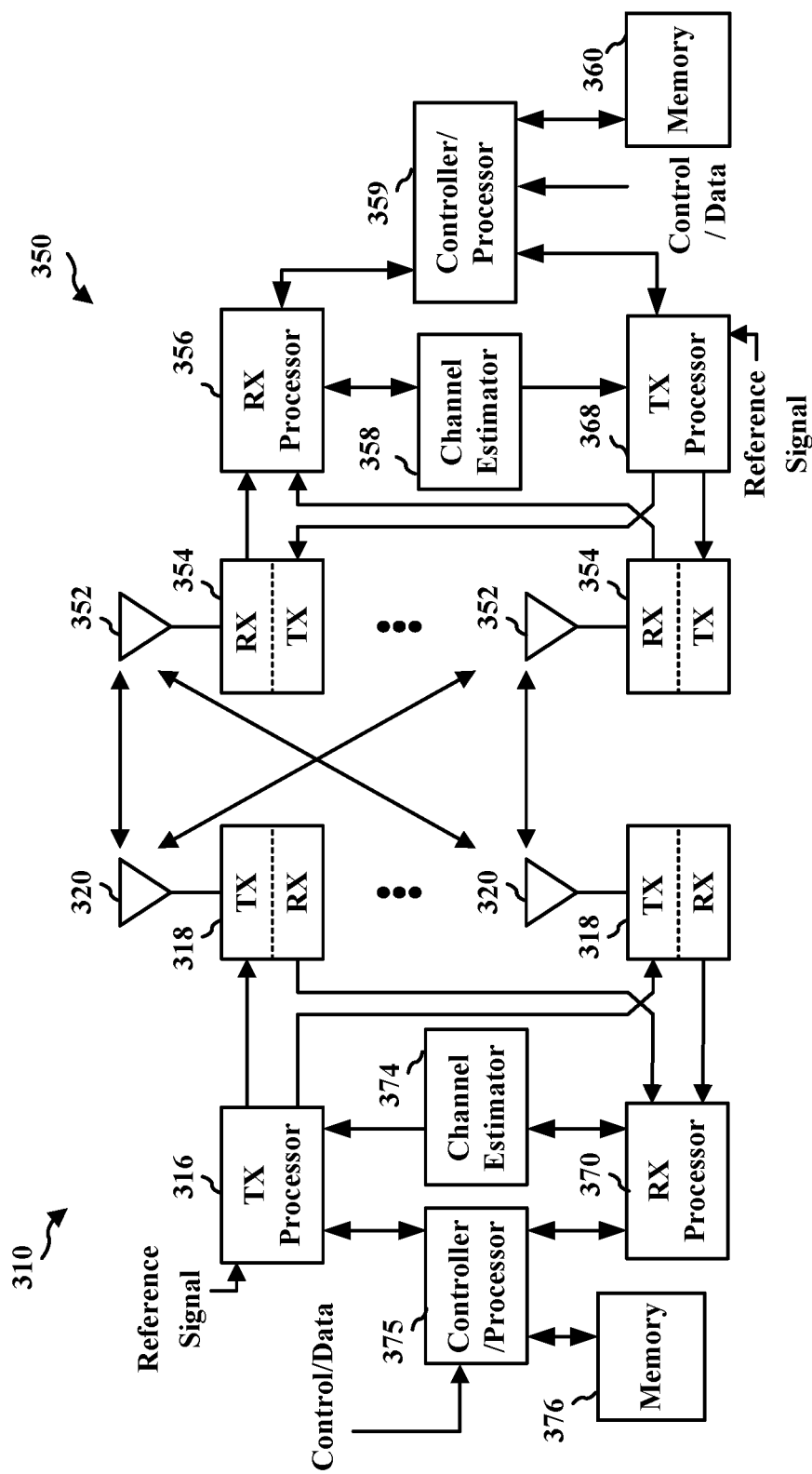
FIG. 3 is a diagram illustrating an example of an integrated access and backhaul (IAB) node and a wireless device in an access network.

FIG. 3 is a block diagram 300 of a first wireless communication device 310 in communication with a second wireless communication device 350 in an IAB network. The device 310 may comprise a parent node, and the device 350 may include a child node. In another example, the device 310 may be an IAB node, and the device 350 may be a wireless device that has an access link with the IAB node. For example, the device 310 may be an IAB node, and the device 350 may be a UE. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 316 or 368, the RX processor 356 or 370, and the controller/processor 359 or 375 may be configured to perform aspects in connection with the child link scheduling component 198 of FIG. 1.

FIG. 4 is a diagram illustrating an integrated access and backhaul (IAB) network 400. The IAB network 400 may include an anchor node (that may be referred to herein as an "IAB donor") 410 and access nodes (that may be referred to herein as "IAB nodes") 420. The IAB donor 410 may be a base station, such as a base station 102 or 180 described in connection with FIG. 1, and may perform functions to control the IAB network 400. The IAB donor 410 provides a wireline connection to a core network. The IAB nodes 420 may comprise L2 relay nodes, etc., that relay traffic between the IAB donor 410 and other IAB nodes or UEs. Together, the IAB donor 410 and the IAB nodes 420 share resources to provide an access network and a backhaul network to core network 490. For example, resources may be shared between access links and backhaul links in the IAB network.

A UE 430 may interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. The UEs 430 communicate with the core network by relaying messages through their respective access link 470 to the IAB network 400, which then may relay the message through backhaul links 460 to the IAB donor 410 to communicate to the core network through the wireline backhaul link 450. Similarly, the core network may communicate with a UE 430 by sending a message to the IAB donor 410 through the wireline backhaul link 450. The IAB donor 410 sends the message through the IAB network 400 via backhaul links 460 to the IAB node 420 connected to the UE 430, and the IAB node 420 sends the message to the UE 430 via the access link 470.

Figure 5:
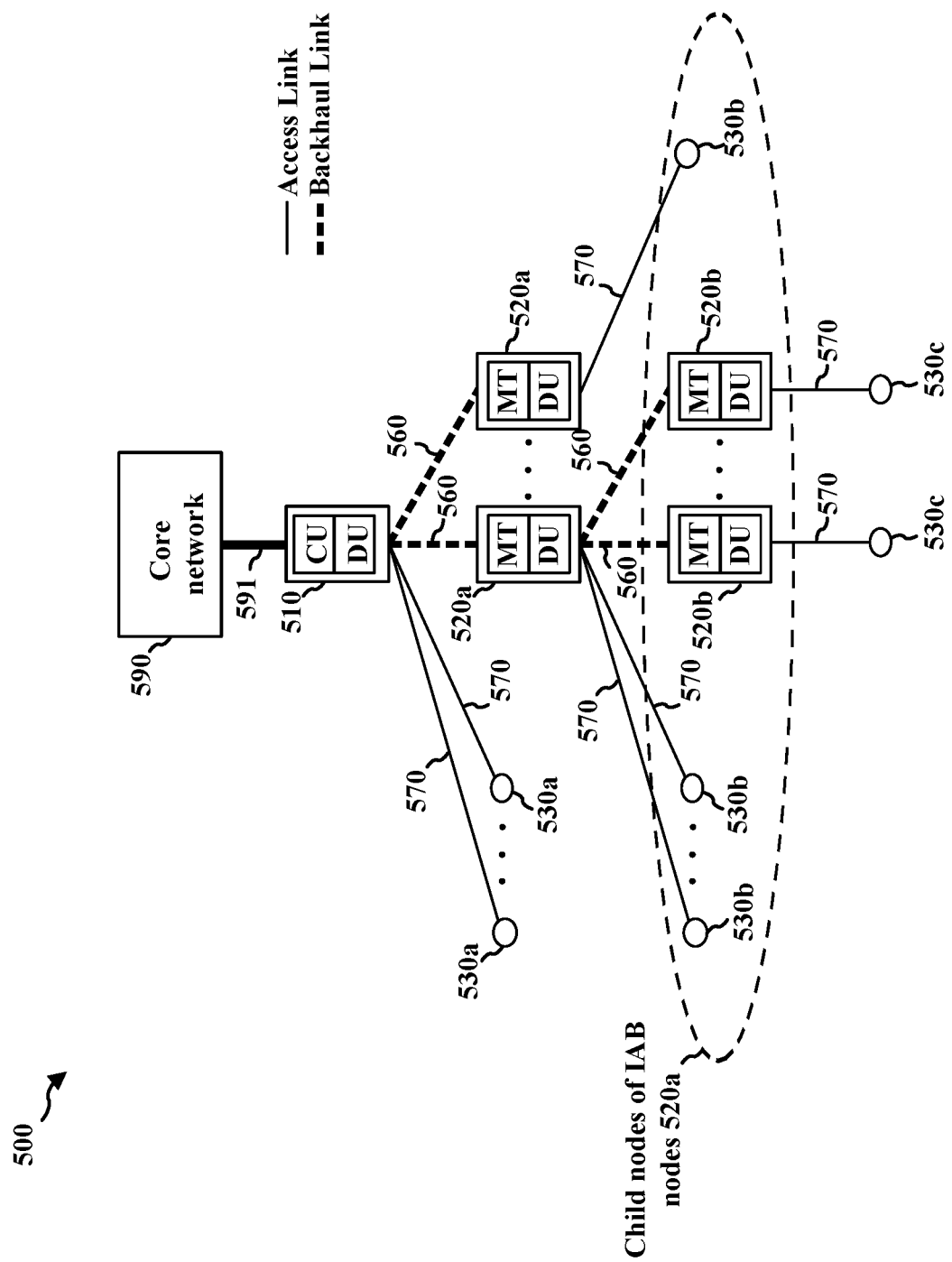
FIG. 5 is a diagram illustrating an IAB network and components thereof.

FIG. 5 is a diagram illustrating another example of an IAB network 500 and components thereof. The IAB network 500 includes an IAB donor 510 and IAB nodes 520a-b. The IAB nodes, as well as the IAB donor 510, may provide wireless access links to UEs 530a-c.

The IAB donor 510 may be considered a root node of the tree structure of the IAB network 500. The IAB donor node 510 may be connected to the core network 590 via a wired connection 591. The wired connection may comprise, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of IAB donor 510. The IAB donor 510 may be connected to its child IAB nodes 520a via backhaul links 560 (the dashed lines), and may be connected to the child UEs 530a via access links 570 (the solid lines). The IAB nodes 520a that are children nodes of IAB node 510 may also have IAB node(s) 520b and/or UE(s) 530b as children. For example, IAB nodes 520b may further connect to additional child nodes and/or child UEs. FIG. 5 illustrates IAB nodes 520b providing an access link to UEs 530c, respectively.

The IAB donor 510 may include a central unit (CU) and a distributed unit (DU). The central unit CU may provide control for the IAB nodes 520a, 520b in the IAB network 500. For example, the CU may be responsible for configuration of the IAB network 500. The CU may perform RRC/PDCP layer functions. The DU may perform scheduling. For example, the DU may schedule resources for communication by the child IAB nodes 520a and/or UEs 530a of the IAB donor 510.

The IAB nodes 520a, 520b may include a mobile termination (MT) and a DU. The MT of IAB node 520a may operate as a scheduled node, scheduled similar to a UE 530a by the DU of the parent node, e.g., IAB donor 510. The MT of IAB node 520b may operate as a scheduled node of parent node 520a. The DU may schedule the child IAB nodes 520b and UEs 530b of the IAB node 520a. As an IAB node may provide a connection to an IAB node that in turn provides a connection for another IAB node, the pattern of a parent IAB node comprising a DU that schedules a child IAB node/child UE may continue.

Figure 6:
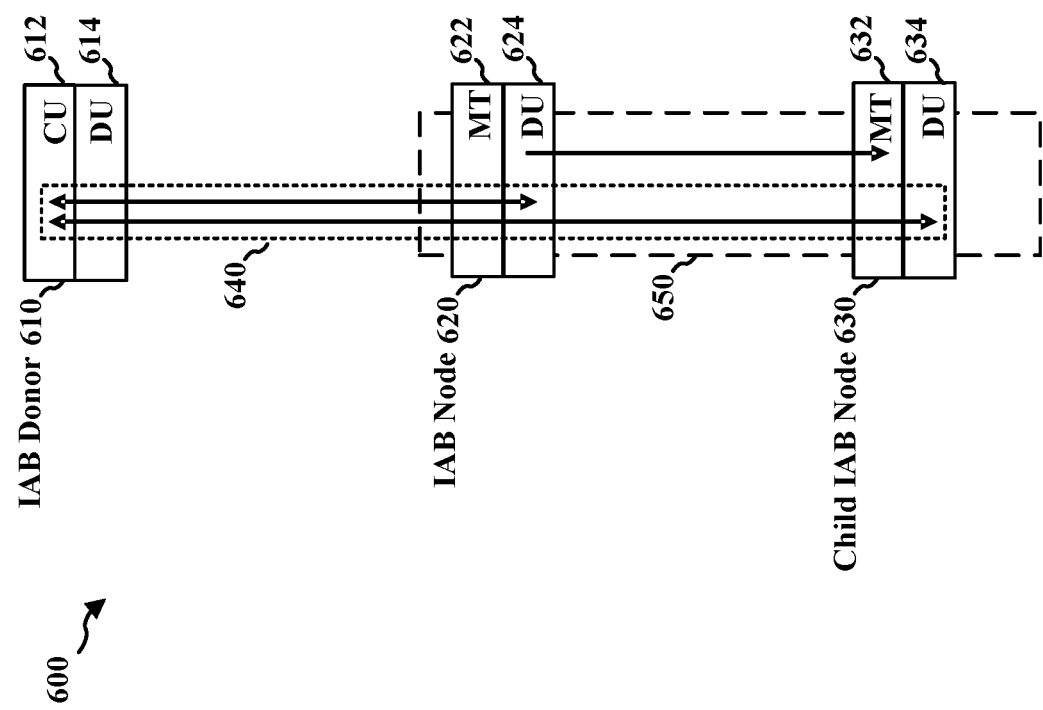
FIG. 6 is a diagram illustrating examples of interaction between an IAB donor, an IAB node, and a child IAB node.

FIG. 6 illustrates examples of interaction between an IAB donor 610, an IAB node 620, and a child IAB node 630. The CU 612 of the IAB donor 610 may provide centralized management of the resources available for communication of the IAB nodes. The CU 612 of the IAB donor 610 may allocate the resources semi-statically. Additionally or alternatively, the soft resources of a child node may be controlled in a distributed dynamic fashion by the parent of the child node (e.g., the DU 624 or 614 of the parent node). For example, the DU 624 of the IAB node 620 may allocate the soft resources of the child IAB node 630 through dynamic control signaling.

The MTs 622 and 632 may have resources that are downlink (DL) resources, uplink (UL) resources, or flexible (F) resources. The DUs 614, 624, and 634 may have hard DL resources, hard UL resources, and/or hard F resources. The DUs 614, 624, and 634 may have soft DL resources, soft UL resources, and/or soft flexible resources. In addition to hard or soft resources types, the DUs 614, 624, and 634 may have resources that are not available (NA) type resources.

The CU 612 of the IAB donor 610 may communicate with the DU 624 of the IAB node 620 and the DU 634 of the child IAB node 630 over an F1 interface 640. The F1 interface 640 may support exchanging information with or transferring encapsulated RRC messages to a child IAB node (e.g., the MT of a child of the receiving IAB node) (e.g., transferring an encapsulated RRC message for the child IAB node 630 to the DU 624 of the IAB node 620). In some aspects, the CU 612 may configure the resource pattern of the DU 624 of the IAB node 620 over the F1 interface 640.

The DU 624 of the IAB node 620 may communicate with the MT 632 of the child IAB node 630 over a Uu air interface 650. The Uu air interface 650 may support transferring RRC messages received from the CU 612 of the IAB donor 610 to the MT 632 of the child IAB node 630, and may support the DU 624 of the IAB node 620 dynamically scheduling the MT 632 of the child IAB node 630. In some aspects, the IAB node 620 may dynamically control the soft resources of the DU 634 of the child IAB node 630 over the Uu air interface 650.

Figure 7:
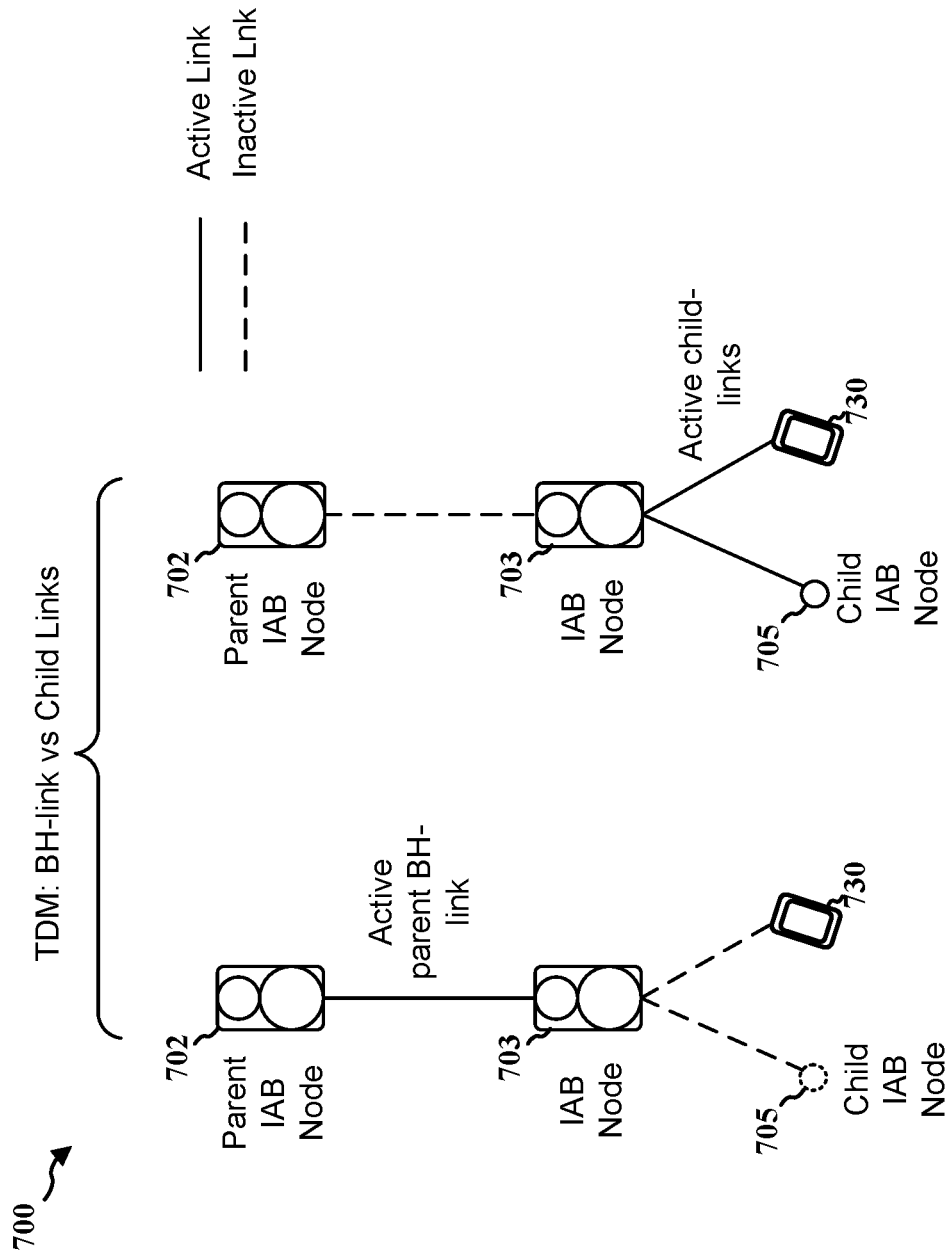
FIG. 7 is a diagram illustrating interaction between IAB nodes in TDM.

IAB nodes may support Time Division Multiplexing (TDM), Frequency Division Multiplexing (FDM), and Space Division Multiplexing (SDM) between access and backhaul links at an IAB-node. FIG. 7 is a diagram 700 illustrating an example relationship between backhaul (BH) link and child links in TDM.

In some IAB networks, MT communication of an IAB node 703 may be TDM with DU communication for the IAB node so that the DU function does not transmit or receive when the MT function has scheduled communication with a parent node and vice versa. For example, when the IAB node 703 transmits or receives communication with the parent IAB node 702, the link between the IAB node 702 and the parent IAB node 702 will be active. The IAB node 703 may not exchange communication with the child IAB node 705 or the UE 730 using overlapping time resources. Similarly, when the IAB node 703 transmits/receives communication with the child IAB node 705 and/or the UE 730, the link between them will be active, and the IAB node 703 may not exchange communication with the parent IAB node 702 using overlapping time resources.

Figure 8:
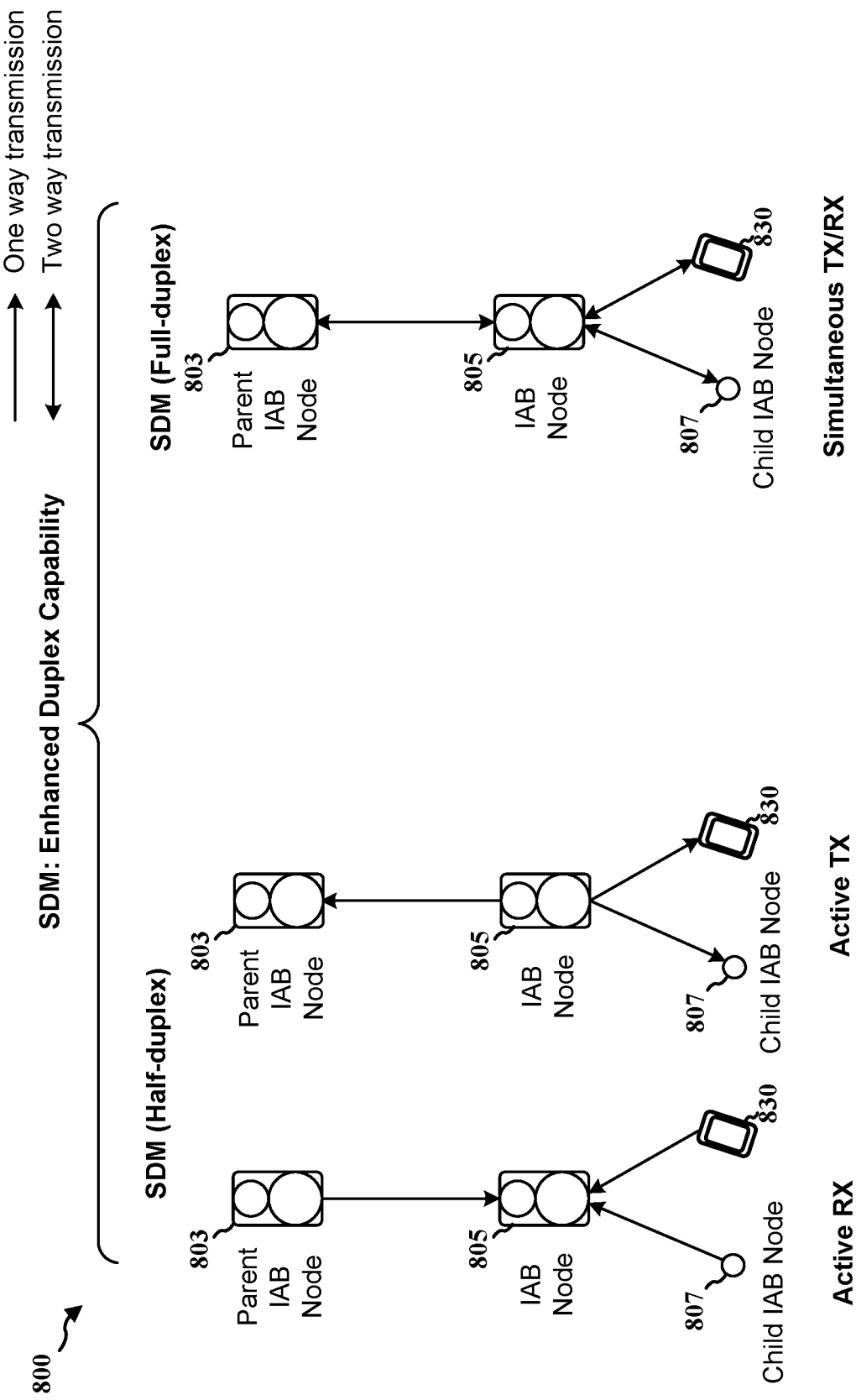
FIG. 8 is a diagram illustrating interaction between IAB nodes in half-duplex and full duplex SDM.

Some IAB networks may have enhanced duplex capability (or operation) under SDM where half-duplex and/or full-duplex SDM transmission may be supported by the network. FIG. 8 is a diagram 800 illustrating half-duplex and full-duplex communication. The communication on different links may use different spatial directions and, thus, may include SDM half-duplex communication. With a half-duplex capability, an IAB node 805 may simultaneously receive data from its parent IAB node 803, child IAB nodes 807, and/or the UE 830. Alternately, the IAB node 805 may simultaneously transmit data to its parent IAB node 803, child IAB nodes 807 and/or the UE 830. In full-duplex communication, an IAB node 805 may simultaneously transmit and/or receive data from its parent IAB node 803, child IAB nodes 807 and/or the UE 830 attaching to it. Thus, full-duplex communication may include the IAB node 805 receiving communication from the parent IAB node 803 in overlapping time resources with a transmission to a child node 807 and vice versa. Half-duplex operation and/or full-duplex operation may be referred to as enhanced duplex operation.

Enhanced duplex operation may be conditional and/or dynamic. For example, enhanced duplex capability (e.g., half-duplex and/or full-duplex) may not be supported at all times. Thus, an IAB node may use enhanced duplex operation during particular times or in particular circumstances and may use TDM operation at other times. For example, the IAB-node with enhanced duplex capability may support enhanced duplex operation under certain conditions, which may dynamically change depending on the surrounding environment such as interference or the presence of clutters, e.g., surrounding objects that may reflect a radio waveform. For example, the conditions for enhanced duplex operation may be dependent on the beam directions used for communication with the parent IAB node and/or the child IAB node. Thus, the conditions for enhanced duplex operation may be beam direction dependent. As an example, the IAB node may use a first beam direction for communication with a parent IAB node over a backhaul link and may use different beam directions for communication with one or more child IAB nodes. As each link to a child IAB node may have a different beam direction, some beam directions may involve less interference from communication over the BH link. Thus, the feasibility of employing enhanced duplex operation at an IAB node may depend on a child IAB node's beam direction relative to a beam direction used by the IAB node for communication with its parent IAB node.

Figure 9:
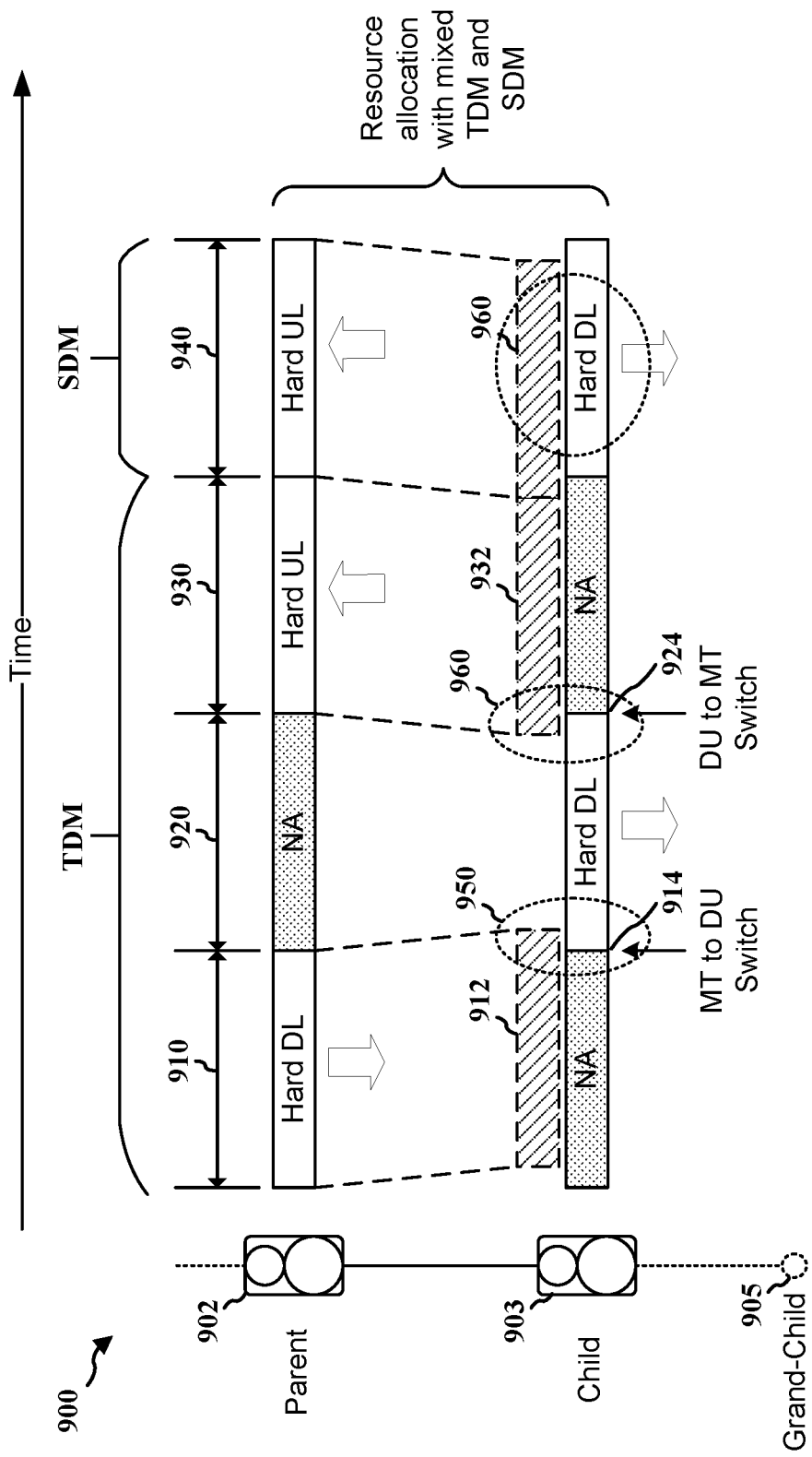
FIG. 9 is a diagram illustrating communication between a child IAB node and its parent.

Further, the resource allocation between parent and child links for an IAB-node with enhanced duplex capability may have mixed TDM and SDM transmissions. FIG. 9 is a diagram 900 illustrating communication between a child IAB node 903 and its parent IAB node 902 with mixed TDM and SDM transmissions. Resources of a DU may be configured as hard, soft, or not available (NA), to avoid conflict with resources being utilized by the MT. When a resource is indicated as hard, the DU can assume it can use the resource regardless of the MT's configuration. The DU may determine whether to use the hard resource to communicate with the child IAB node regardless of whether MT has an allocation from the parent IAB node. When a resource is indicated as NA, it is unavailable for use by the DU. When a resource is indicated as soft, the DU may determine whether it may utilize the resource based on whether doing so would impact the MT transmitting or receiving on the resource. A soft resource may be explicitly or implicitly indicated as available.

In the example in FIG. 9, TDM operation is employed for the time domain resources 910, 920 and 930 and SDM operation is employed during time domain resource 940, e.g., the child IAB node 903 may transmit to the parent IAB node 902 and the grand-child node 905 in overlapping times. For example, the parent IAB node 902 may transmit downlink communication 912 to the child IAB node 903 during time domain resources 910, and the time domain resources 910 may be considered NA for the DU function of the child node 903.

The child IAB node 903 may transmit downlink data to a child entity, such as another IAB node (e.g., grand-child 905) or a UE, on the second set of resources 920. The child DU 903 may be configured as hard for the second set of resources 920, and the parent DU 902 may be configured as NA for the second set of resources 920 so that the child MT and the parent DU may not communicate with one another on the second set of resources 920.

The child IAB node 903 may transmit uplink data to the parent IAB node 902 on the third set of resources 930. The third set of resources 930 may be configured as UL for the child MT to transmit the uplink transmission 932 to the parent DU. The third set of resources 930 may be configured as NA for the child DU to prevent the child DU from interfering with the child MT transmitting the uplink data to the parent DU. The third set of resources 930 may be configured as hard for the parent DU so that the parent DU may decide whether to use the resources to receive uplink data from the child MT.

As the child IAB node 903 communicates utilizing its MT function on the first set of resources 910 and communicates utilizing its DU function on the second set of resources 920, the child IAB node 903 performs a transition between its MT and DU functions (e.g., an MT to DU switch) at the time 914 between the two sets of resources 910 and 920. Similarly, as the child IAB node 903 communicates utilizing its DU function on the second set of resources 920 and communicates utilizing its MT function on the third set of resources 930, the child IAB node 903 performs a transition between its DU function and its MT function (e.g., a DU to MT switch) at the time 924 between the two sets of resources 920 and 930.

Due to a propagation latency or a timing advance, resource allocations may overlap between resources allocation for an MT function of an IAB node (e.g., child IAB node 903) and a DU function of the IAB node. For example, the child IAB node may perform the MT to DU 914 before receiving all of the downlink transmission 912 from the parent IAB node 902. For example, referring back to FIG. 9, although the parent IAB node 902 transmits downlink data on the first set of resources 910, the transmission may actually be received at the child IAB node 903 on resources 912, slightly delayed from the first set of resources 910. Some of the resources 912 may overlap (e.g., overlap 950) with the second set of resources 920 when the child IAB node 903 transmits downlink data to a grand-child device 905. A similar delay in receiving the uplink transmission 932 may lead the child IAB node to begin the transmission 932 using its MT function prior to the end of the time resources 920 transmit, so that an overlap 960 may occur between resources due to propagation delay or timing advance.

As illustrated at time resource 940, the parent IAB node 902 may be scheduled to transmit uplink data while the child IAB node 903 may be scheduled to transmit a downlink data to a grandchild IAB node 905. Thus, two scheduled transmission may overlap with each other as shown at 960.

Figure 10:
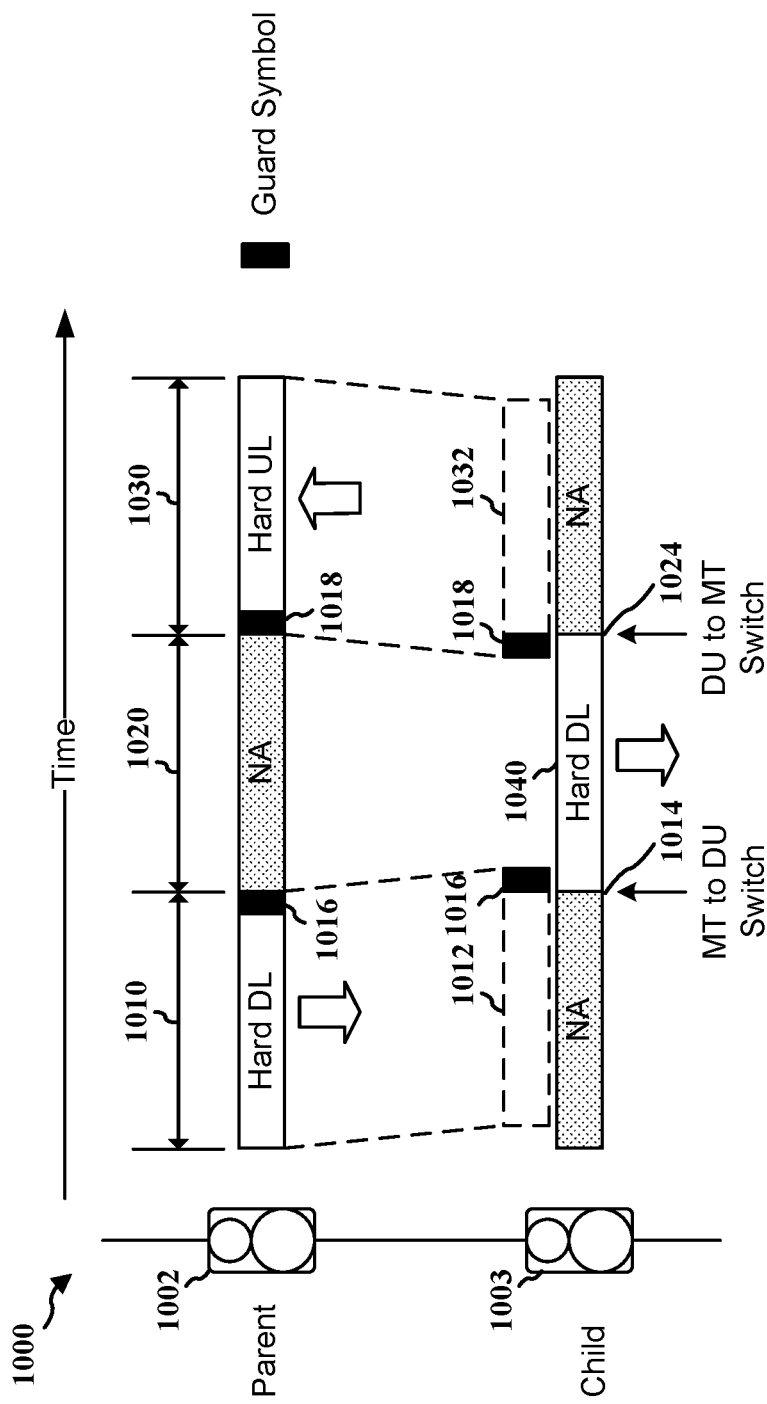
FIG. 10 is a communication diagram illustrating guard symbol signaling between a child IAB node and a parent IAB node.

As shown by diagram 1000 in FIG. 10, to reduce or avoid overlapping or interference, the parent IAB node 1002 and the child IAB node 1003 may utilize guard symbols at transition times (e.g., time 1014 and time 1024). A guard symbol may be a resource on which the corresponding IAB node does not transmit. An IAB node may utilize one or more different component (e.g., different transmitter(s), different receiver(s), or different antenna(s)) and/or different analog beams for its MT and its DU). The guard symbols may provide time for the IAB node to switch between components used for the MT and components used for the DU. The guard symbols may also prevent conflicts due where an MT and a DU of an IAB node are both supposed to be operating at the same time (e.g., due to propagation delay or timing advance).

For example, as illustrated in FIG. 10, although the parent IAB node 1002 transmits downlink data on the first set of resources 1010, the transmission may actually be received at the child IAB node 1003 on resources 1012, slightly delayed from the first set of resources 1010. Some of the resources 1012 overlap with the second set of resources 1020 on which the child node 1003 (e.g., child MT) is configured to transmit downlink data to another device. The parent IAB node 1002 may provide guard symbols 1016 at the end of the resources 1010 to allow the child IAB node 1003 to transition from use of the MT to receive downlink data to use of the DU to transmit downlink data without conflict. The guard symbols may also be provided by the child IAB node 1003 at the beginning of the resources 1040 to serve a similar purpose. Uplink data transmitted on resources 1032 from the child IAB node 1003 to the parent IAB node 1002 may face similar challenges, and the parent IAB node 1002 may provide guard symbols 1018 at the beginning of resources 1030 to allow the child IAB node 1003 to transition from use of the DU to transmit downlink data to use of the MT to transmit uplink data without conflict. Similarly, the guard symbols 1018 may also be provided by the child IAB node at the end of resources 1020 to serve a similar purpose.

Figure 11:
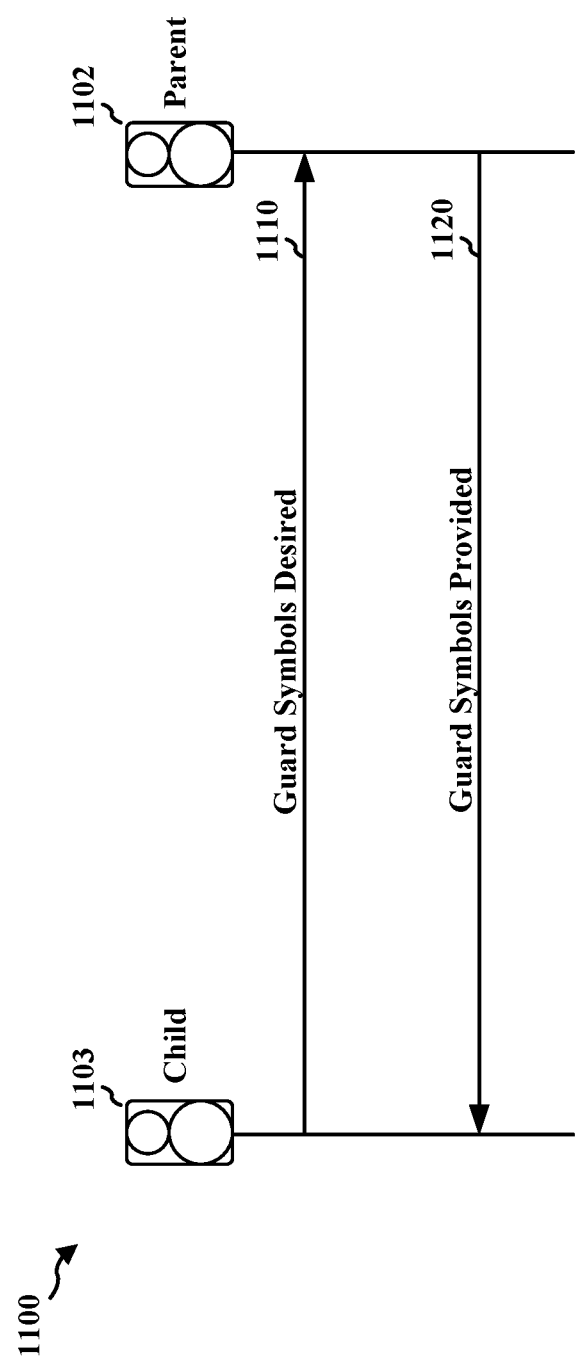
FIG. 11 is a communication diagram illustrating guard symbol signaling.

FIG. 11 is a communication diagram 1100 illustrating guard symbol signaling between a child IAB node 1103 and a parent IAB node 1102. The guard symbols for a transition may be located at the resources immediately before the transition, the resources immediately after the transition, or may be split between both the resources immediately before and immediately after the transition. The child IAB node 1103 and the parent IAB node 1102 may communicate to indicate an amount of the guard symbols requested by the child IAB node 1103 (e.g., in signaling 1110) and to indicate an amount of guard symbols that will be provided by the parent IAB node 1102 (e.g., in signaling 1120). However, the signaling messages informing how many guard symbols would be provided may be optional, and a parent IAB node may or may not provide guard symbols for child IAB node(s) at transition instance(s). In some examples, if no signaling on guard symbols is received at a child IAB node or other receiving IAB node, the number of provided guard symbols from the parent node (or another transmitting node) may be assumed to be zero.

In some IAB networks or system implementation, the child IAB node 1103 may know whether guard symbols are provided by the parent IAB node 1102 such as through knowledge or assumption known to both nodes, or the IAB donor may notify both the child IAB node 1103 and the parent IAB node 1102. In some other IAB networks or system implementation, the child IAB node 1103 or any receiving IAB node(s) may not know whether guard symbols are provided by their parent IAB node 1102 (or a transmitting IAB node) as there may be no common knowledge or assumption at both nodes.

Referring back to FIG. 10, as described above, a parent IAB node 1002 may provide guard symbols (e.g., guard symbols 1016, 1018) to allow a child IAB node 1002 to transition between use of its MT and DU. Signaling 1110 (FIG. 11) may indicate the number of guard symbols desired by the child IAB node 1003 from the parent IAB node 1002 at transition instances (e.g., at times 1014 and 1024), e.g., based on the transition type. The signaling 1120 (FIG. 11) may indicate the number of guard symbols provided by the parent IAB node 1002 at transition instances based on the transition type.

In some examples, a child IAB node 1003 may know whether or not guard symbols are provided by the parent IAB node 1002 for a transition instance. For example, both the parent IAB node 1002 and the child IAB node 1003 may make the same determination regarding when a transition instance occurs and the type of the transition so that the parent IAB node 1002 may include the appropriate number of guard symbols and the child IAB node 1003 may properly utilize the provided guard symbols. Accordingly, the parent IAB node 1002 and the child IAB node 1002 may use the same information to determine transition instances and transition types.

In certain circumstances, a child IAB node 1003 may not know whether guard symbols are provided by a parent IAB node 1002 for a particular transition instance. For example, a parent IAB node may not have full information on its child IAB node(s) to identify every actual transition instance (e.g., MT to DU or DU to MT transition) at the child IAB node(s). The parent IAB node may not know a child IAB node's scheduling for grand-child node(s). The parent IAB node may be able to identify "potential transition instances" to provide guard symbols for child IAB node(s) rather than actual transition instances.

Figure 12:
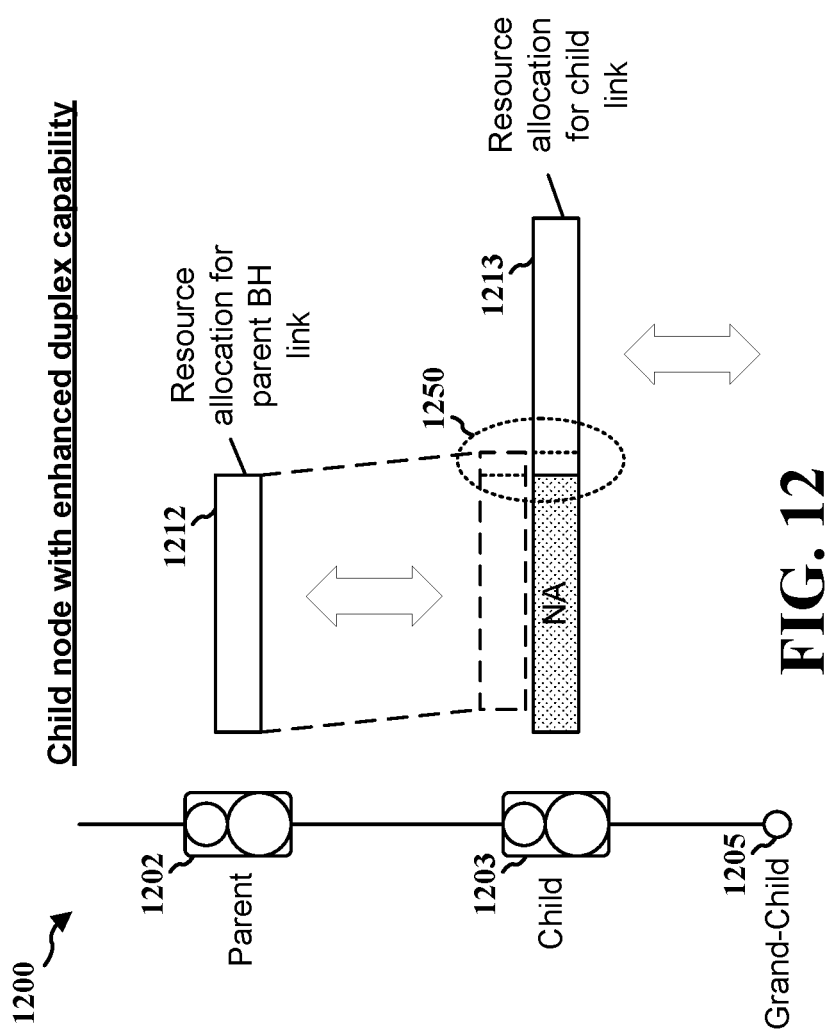
FIG. 12 is a communication diagram illustrating resource overlapping.

Overlapping resource allocations may occur when no guard symbols or insufficient guard symbols are provided from a transmitting IAB node (e.g., a parent IAB node). FIG. 12 is a communication diagram 1200 illustrating overlapping resources for a grand-child 1205 of a child IAB node 1203 and for a parent IAB node 1202. The child IAB node 1203 may be capable of enhanced duplex operation (e.g., full-duplex and/or half-duplex). In some transition instances, there may be overlapped time resources (e.g., at overlap 1250) between resource allocation 1212 for a parent IAB node's 1202 BH link and resource allocation 1213 for communication with the grand-child IAB node 1205 link where insufficient guard symbols, or no guard symbols, are provided by the parent IAB node 1202 for the MT to DU transition at the child IAB node 1203. For example, the parent IAB node 1202 may provide a number of guard symbols that is less than the number of guard symbols desired by the child IAB node 1203, or even zero guard symbols.

The overlapped resources for the two allocations may lead to interference between these two types of communication. As presented herein, the child IAB node 1203 may adjust its scheduling decision for communication with grand-child node 1205 using its DU function based on its knowledge of whether guard symbols will be provided by the parent node 1202 at a transition instance. For example, the IAB node 1203 may adjust scheduling for transmission and/or reception of communication with the grand-child IAB node 1205 in order to manage interference or Quality of service (QoS) for communication with the parent IAB node 1202 and/or the grand-child IAB node 1205. For example, if sufficient guard symbols are provided by the parent IAB node 1202 so that there are no overlapped resources (e.g., no overlap 1250), the IAB node 1203 may flexibly schedule communication with the grand-child IAB node 1205. If there are overlapped resources due to insufficient guard symbols or due to a lack of guard symbols being provided by the parent IAB node 1202, the IAB node 1203 may adjust scheduling for the grand-child IAB node 1205.

Figures 13A, 13B:
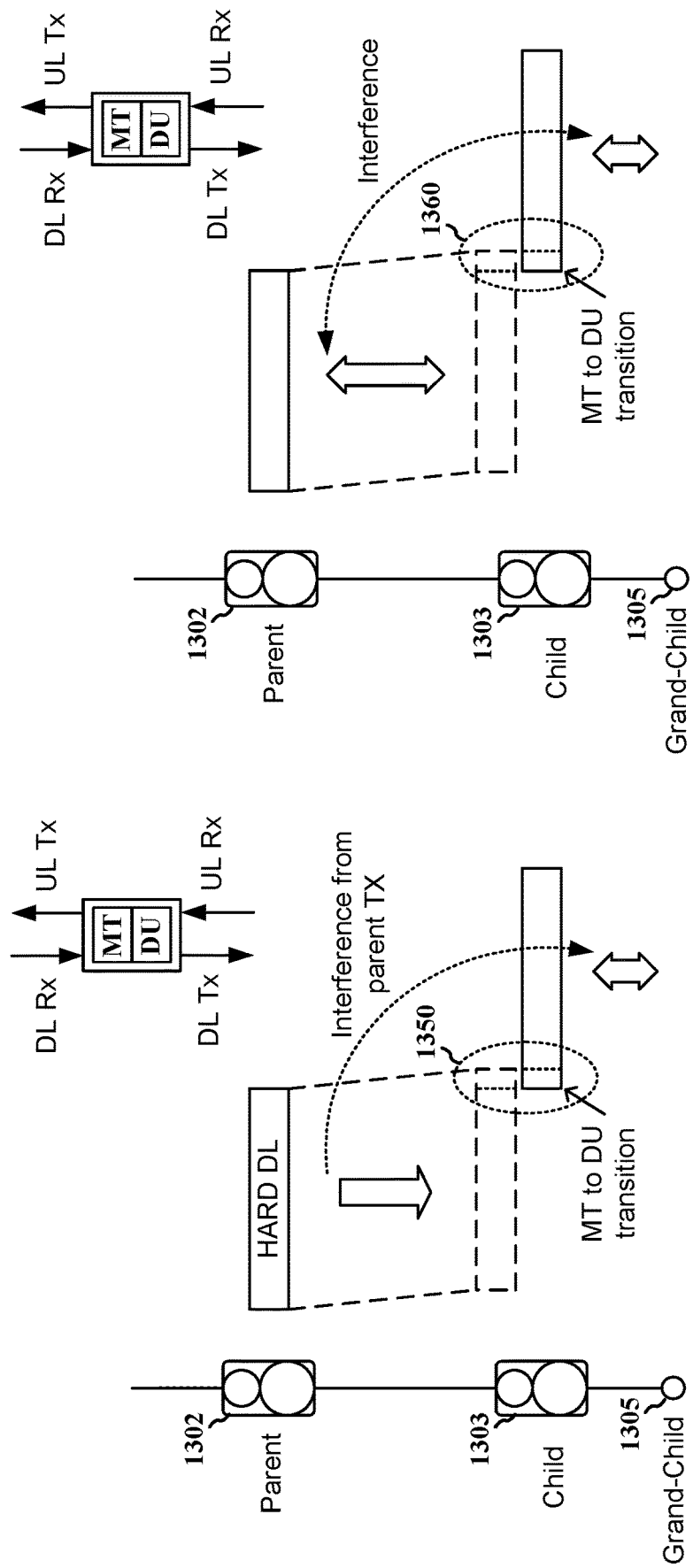
FIGS. 13A and 13B are communication diagrams illustrating interference.

FIGS. 13A and 13B are communication diagrams illustrating two potential interference scenarios during transition instances at a child IAB node 1303 that may result in overlapping resources for communication using an MT function and a DU function of the IAB node 1303 (e.g., overlaps 1350, 1360). The first interference scenario in FIG. 13A, shows the child IAB node 1303 in TDM operation, whether the IAB node 1303 has a TDM capability or current circumstances lead to TDM operation. As shown by FIG. 13A, and described in connection with FIG. 12, when zero or insufficient guard symbols are provided by the parent IAB node 1302, overlapping resources may be allocated may for communication with a parent IAB node 1302 and a grand-child IAB node 1305.

In some examples, the child IAB node 1302 may determine, or comprise a configuration or setting that indicates, whether to use the overlapping resource portion 1350 to communicate with a parent link via its MT function or to communicate with a child link via its DU function. If the IAB node 1303 uses the overlap resource 1350 for communicate with parent link via its MT function, the IAB node may decide to puncture or discard the overlapping resource at its DU. However, in some circumstances, if communication over parent link is downlink (e.g., hard DL), even though the child IAB node 1303 cancels (e.g., punctures or drops) the reception of communication with the parent link via its MT function in order to use the overlapping resources 1350 for the DU function, the parent IAB node 1302 may continue to transmit data as scheduled. The continuing transmission of the data from the parent IAB node 1302 may cause interference to communication with a grand-child IAB node 1305 (e.g., whether uplink or downlink communication using the DU function of the IAB node 1303). For example, the parent IAB node's overlapping downlink transmission may interfere with the child IAB node's reception of uplink communication from the grand-child IAB node 1305 or may interfere with the grand-child IAB node's reception of downlink communication from the child IAB node 1303.

In the second interference scenario in FIG. 13B, the child IAB node 1303 may have enhanced duplex capability and may operate under a half-duplex mode or a full-duplex mode. Due to the enhanced duplex capability, the child IAB-node 1303 may transmit and receive simultaneously both with the parent IAB node 1302 (e.g., link to parent IAB node 1302) and the child IAB node 1305 (e.g., link to child IAB node 1303) links, and there may be resulting interference between the overlapping communication (e.g., at overlapping portion 1360).

As mentioned previously, even if the child IAB node 1303 determines to use the overlapping resources to exchange communication with one of the IAB nodes, interference may occur, e.g., if the parent IAB node 1302 or grandchild IAB node 1305 continues to transmit data during the overlap portion 1360.

To reduce the likelihood of interference occurring, an IAB-node (e.g., IAB node 1303) may adjust its scheduling decision for child links for better management of interference or QoS depending on its knowledge about guard symbols provided for the IAB node (e.g., provided in scheduled communication with a parent IAB node).

Figure 14:
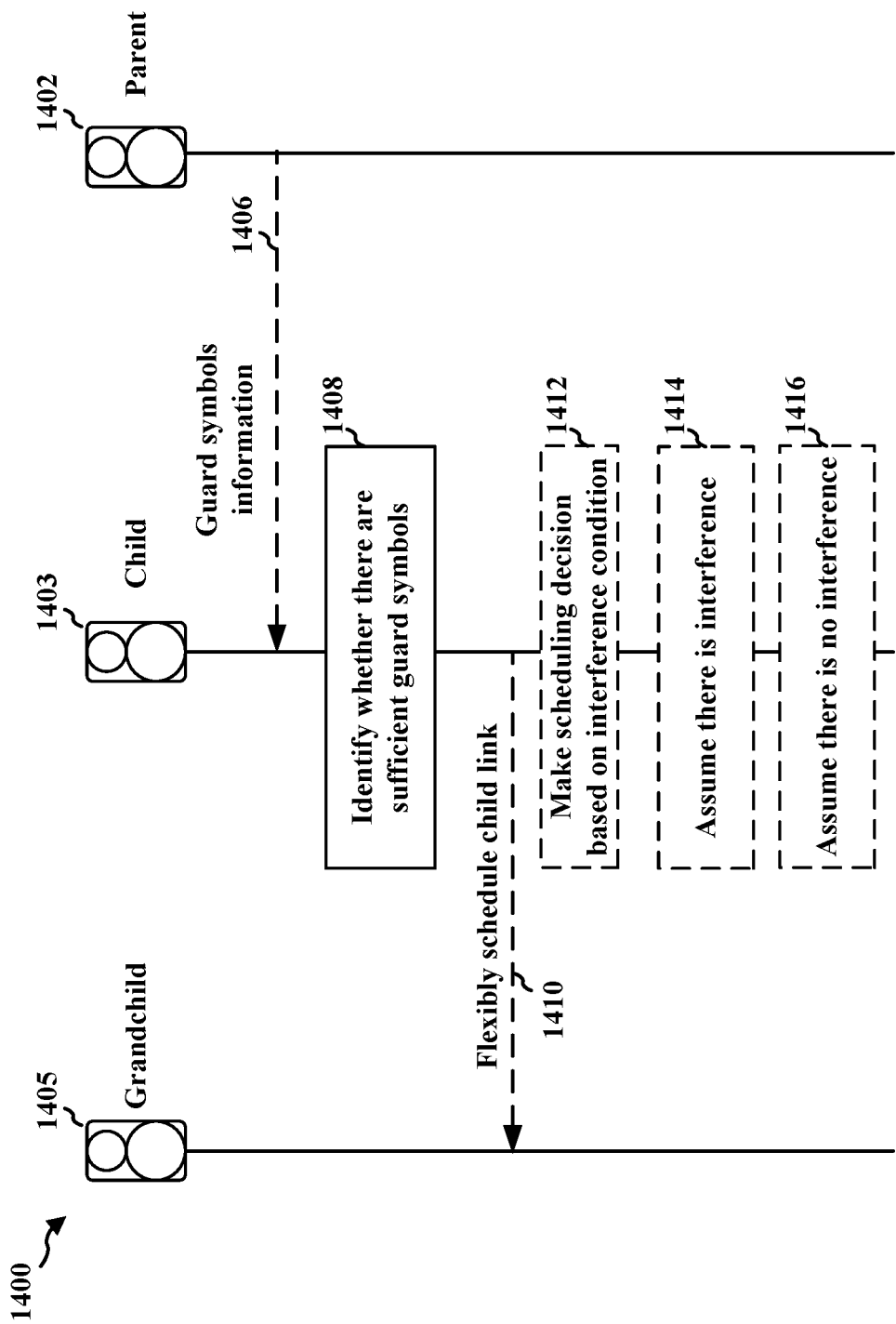
FIG. 14 is a communication diagram illustrating scheduling decision between a child IAB node, a parent IAB node and a grandchild IAB node.

FIG. 14 is a communication diagram between a child IAB node 1403, a parent IAB node 1402 and a grandchild IAB node 1405 (which may also be referred as the child node or link of child IAB node 1403). In some examples, the child IAB node 1403 may first identify, at 1408, whether there are guard symbols, or sufficient guard symbols, provided in communication from the parent IAB node 1402 in upcoming transmission(s) or resources allocation(s). Information related to the availability and/or number of guard symbols 1406 from parent IAB node 1402 may be transmitted from the parent IAB node 1402 or from an IAB donor.

If the child IAB node 1403 identifies that guard symbols are provided by the parent IAB node 1402, at 1408, the child IAB node 1403 may assume that there is unlikely any overlapped resources between resource allocation(s) for the parent link and resource allocation(s) for the child links. In this case, the DU of the child IAB node 1403 may flexibly schedule its child links 1410 (e.g., link between child IAB node 1403 and grandchild IAB node 1405). The IAB node 1403 may schedule communication with the grandchild IAB node 1405 without considering the overlapping resources when the guard symbols are provided.

In other examples, if the child IAB node 1403 identifies that no, or insufficient, guard symbols are provided by parent IAB node 1402, at 1408, the child IAB node 1403 may assume that there is likely overlapped resources between resource allocation(s) for the parent link and resource allocation(s) for the child links during transition instance(s). In this case, the DU of the child IAB node 1403 may make adjusted scheduling decision over child links based on interference conditions from parent backhaul link, as shown at 1412. For example, the child IAB node 1403 may select a child link with less interference among all child links from parent backhaul link. In other examples, the child IAB node 1403 may determine a beam direction, a communication direction, a transmission power, a rate for the communication, and/or a resource block allocation for communication with the grandchild IAB node 1405 based on the potential interference from the parent IAB node 1402. The selected rate may be based on a MCS and/or a rank. The child IAB node 1403 may also determine to not transmit or receive data during the interference period, transmit important signals such as DM-RS outside of interference period (e.g., modify resource allocation), change transmission parameters, etc.

If the child IAB node 1403 does not know whether there are guard symbols provided by the parent IAB node 1402, such as when the child IAB node 1403 does not receive any guard symbol information 1406 from the parent IAB node 1402 or that the child IAB node 1403 and the parent IAB node 1402 do not have common rules, knowledge or assumption about guard symbols, the child IAB node 1403 may be configured to take a conservative approach or an opportunistic approach. For example, the child IAB node 1403 may use a conservative approach, as shown at 1414, by assuming that there is interference (e.g., in the overlapped resources) and making scheduling decision over child links based on interference conditions, similar to 1412. The child IAB node 1403 may take an opportunistic approach, as shown at 1416, and may flexibly schedule communication with the grand-child IAB node 1405 as though interference is unlikely in the overlapped resources (e.g., without considering possible interference from BH link).

Figure 15:
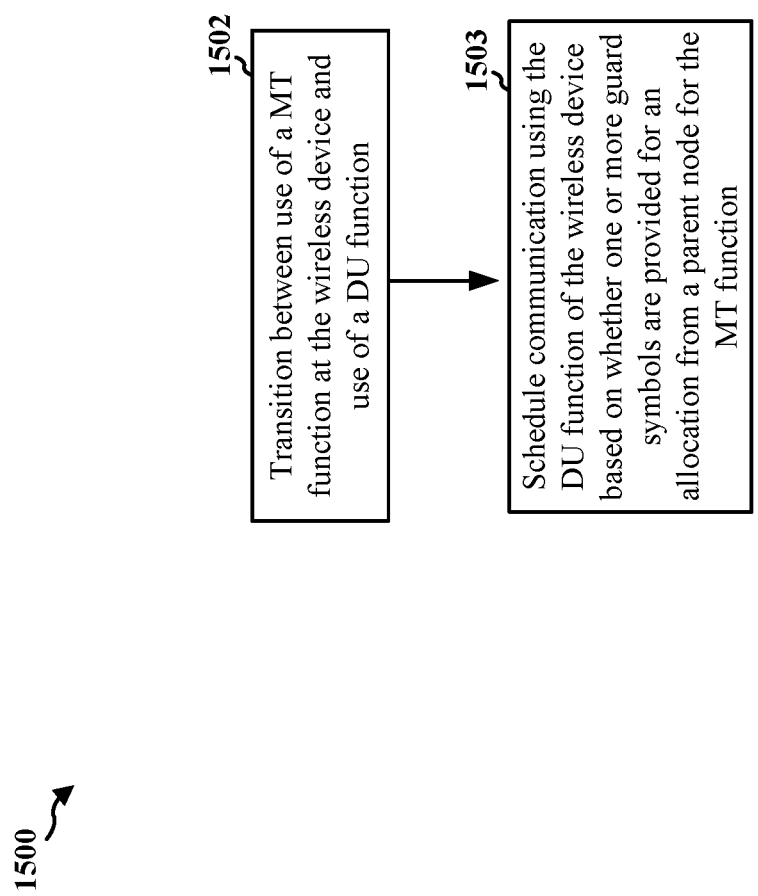
FIG. 15 is a flowchart of a method of wireless communication.

FIG. 15 is a flowchart of a method 1500 of wireless communication at a wireless device. The wireless device may comprise an IAB node (e.g., IAB node 103, 420, 520a, 520b, 620, 703, 803, 903, 1003, 1102, 1203, 1303, or 1403 or device 310 or 350). Optional aspects are illustrated with a dashed line.

At 1502, the wireless device may transition between use of an MT function and use of a DU function at the wireless device, e.g., an MT-to-DU transition or a DU-to-MT transition. For example, the wireless device may transition from transmitting/receiving communication with a parent IAB node to transmitting/receiving communication with a child IAB node or a UE or the opposite transition. The transition may include aspects described in connection with any of FIGS. 9-14.

At 1503, the wireless device schedules communication using the DU function of the wireless device based on whether one or more guard symbols are provided for an allocation from a parent node for the MT function.

Figure 16:
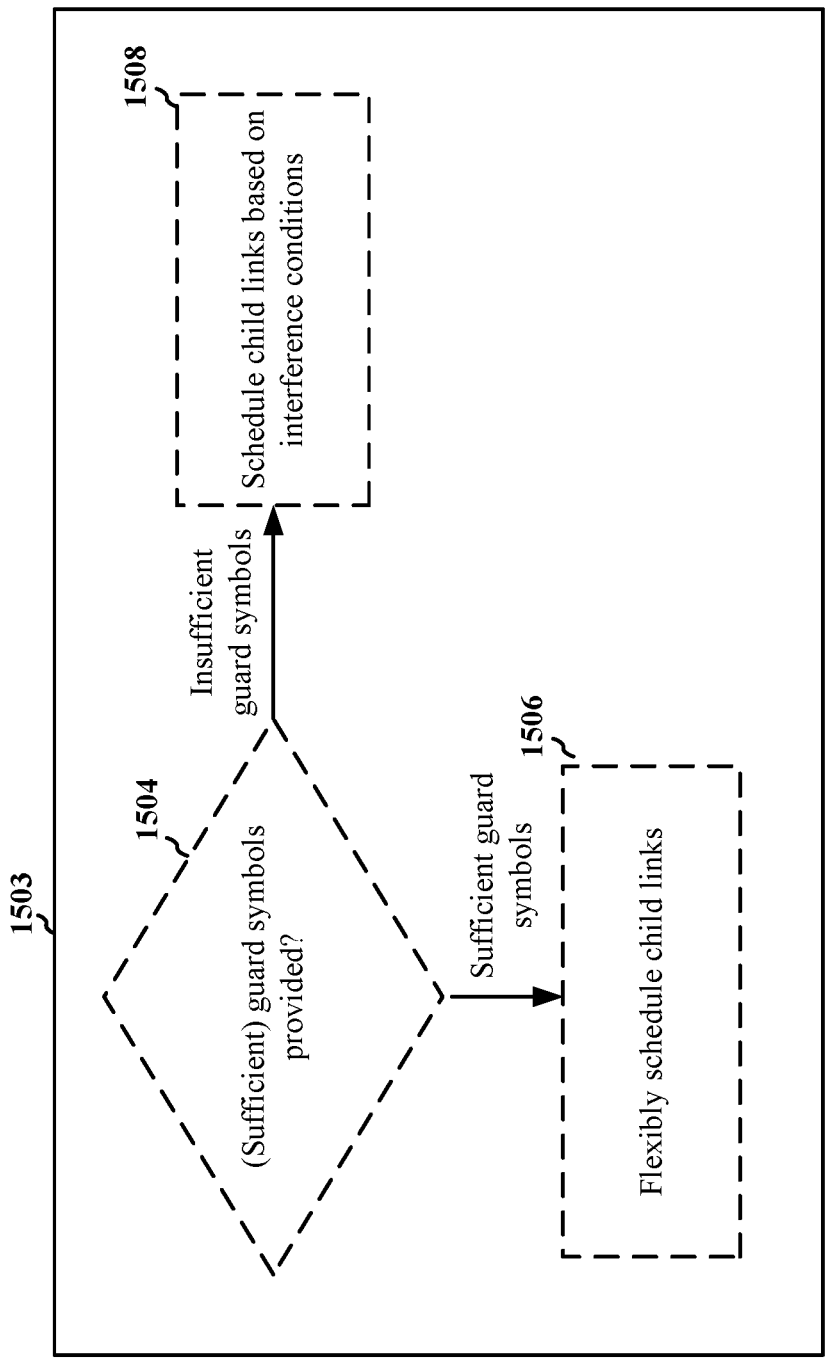
FIG. 16 is a flowchart of a method of wireless communication.

As shown in FIG. 16, scheduling the communication may include determining whether one or more guard symbols are provided by a parent node and/or whether a sufficient number of guard symbols are provided by the parent node, at 1504. If the wireless device determines, at 1504, that one or more guard symbols are provided by the parent node and/or that sufficient number of guard symbols are provided, the wireless device may schedule the communication using the DU function without adjustment, at 1506. For example, wireless device may assume there is no overlapping resources between allocations for parent and child links, and may flexibly schedule its child links, e.g., as described in connection with FIG. 14.

If the wireless device determines, at 1504, that one or more guard symbols are not provided by the parent node (e.g., there is zero or insufficient guard symbols), the wireless device may schedule the communication using the DU function based on interference conditions, at 1508. For example, scheduling the communication, at 1508, may include selecting a link having a lower interference level from the allocation from the parent node for the MT function based on the one or more guard symbols are not provided by the parent node as described in connection with FIG. 14. In other examples, scheduling the communication, at 1508, may include selecting a beam direction, a communication direction, a transmission power, and/or a rate for the communication based on the one or more guard symbols not being provided by the parent node. The selected rate for the communication may be based on one or more of a MCS or a rank. In other examples, scheduling the communication, at 1508, may include determining a resource block allocation for the communication based on the one or more guard symbols not being provided by the parent node.

If the wireless device does not know whether the parent node provided the one or more guard symbols, the wireless device may schedule the communication based on interference from the allocation from the parent node for the MT function, as shown at 1508 and as described in connection with FIG. 14. Alternately, if the wireless device does not know whether the parent node provided the one or more guard symbols, the wireless device may schedule the communication without adjustment, as shown at 1506 and as described in connection with FIG. 14.

Example 1 is a method of wireless communication at a wireless device, comprising: transitioning from use of a mobile termination (MT) function at the wireless device to use of a distributed unit (DU) function; and scheduling communication using the DU function of the wireless device based on whether one or more guard symbols are provided for an allocation from a parent node for the MT function.

In Example 2, the method of Example 1 further includes that if the one or more guard symbols are provided by the parent node, the wireless device schedules the communication using the DU function without adjustment.

In Example 3, the method of Example 1 or Example 2 further includes that if the one or more guard symbols are not provided by the parent node, the wireless device schedules the communication using the DU function based on interference conditions.

In Example 4, the method of any of Examples 1-3 further includes that scheduling the communication using the DU function includes selecting a link having a lower interference level from the allocation from the parent node for the MT function based on the one or more guard symbols are not provided by the parent node.

In Example 5, the method of any of Examples 1-4 further includes that scheduling the communication using the DU function includes selecting a beam direction based on the one or more guard symbols not being provided by the parent node.

In Example 6, the method of any of Examples 1-5 further includes that scheduling the communication using the DU function includes selecting a communication direction based on the one or more guard symbols not being provided by the parent node.

In Example 7, the method of any of Examples 1-6 further includes that scheduling the communication using the DU function includes selecting a transmission power based on the one or more guard symbols not being provided by the parent node.

In Example 8, the method of any of Examples 1-7 further includes that scheduling the communication using the DU function includes selecting a rate for the communication based on the one or more guard symbols not being provided by the parent node.

In Example 9, the method of any of Examples 1-8 further includes that the rate is based on one or more of a modulation and coding scheme (MCS) or a rank.

In Example 10, the method of any of Examples 1-9 further includes that scheduling the communication using the DU function includes determining a resource block allocation for the communication based on the one or more guard symbols not being provided by the parent node.

In Example 11, the method of any of Examples 1-10 further includes that if the wireless device does not know whether the parent node provided the one or more guard symbols, the wireless device schedules the communication based on interference from the allocation from the parent node for the MT function.

In Example 12, the method of any of Examples 1-11 further includes that if the wireless device does not know whether the parent node provided the one or more guard symbols, the wireless device schedules the communication without adjustment.

In Example 13, the method of any of Examples 1-12 further includes that the wireless device comprises an integrated access and backhaul (IAB) node.

Example 14 is a device including one or more processors and one or more memories in electronic communication with the one or more processors storing instructions executable by the one or more processors to cause the device to implement a method as in any of Examples 1-13.

Example 15 is a system or apparatus including means for implementing a method or realizing an apparatus as in any of Examples 1-13.

Example 16 is a non-transitory computer readable medium storing instructions executable by one or more processors to cause the one or more processors to implement a method as in any of Examples 1-13.

Further disclosure is included in the Appendix.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a wireless device, comprising:
   transitioning between use of a mobile termination (MT) function at the wireless device and use of a distributed unit (DU) function; and
   scheduling a communication with a child node of the wireless device using the DU function of the wireless device based on whether or not one or more guard symbols are provided for an allocation from a parent node for the MT function, wherein:
   in response to the one or more guard symbols being provided for the allocation from the parent node and a number of the one or more guard symbols being equal to a number of requested guard symbols of the wireless device, the wireless device schedules the communication using the DU function without adjustment; and
   in response to the one or more guard symbols being provided for the allocation from the parent node and the number of the one or more guard symbols being less than the number of requested guard symbols of the wireless device, the wireless device schedules the communication using the DU function based on interference conditions.

2. The method of claim 1, wherein scheduling the communication using the DU function based on the interference conditions includes selecting a link having a lower interference level from the allocation from the parent node for the MT function based on the one or more guard symbols not being provided by the parent node.

3. The method of claim 1, wherein scheduling the communication using the DU function based on the interference conditions includes selecting a beam direction based on the one or more guard symbols not being provided by the parent node.

4. The method of claim 1, wherein scheduling the communication using the DU function based on the interference conditions includes selecting a communication direction based on the one or more guard symbols not being provided by the parent node.

5. The method of claim 1, wherein scheduling the communication using the DU function based on the interference conditions includes selecting a transmission power based on the one or more guard symbols not being provided by the parent node.

6. The method of claim 1, wherein scheduling the communication using the DU function based on the interference conditions includes selecting a rate for the communication based on the one or more guard symbols not being provided by the parent node.

7. The method of claim 6, wherein the rate is based on one or more of a modulation and coding scheme (MCS) or a rank.

8. The method of claim 1, wherein scheduling the communication using the DU function based on the interference conditions includes determining a resource block allocation for the communication.

9. The method of claim 1, wherein the wireless device comprises an integrated access and backhaul (IAB) node.

10. An apparatus for wireless communication at a wireless device, comprising:
    means for transitioning between use of a mobile termination (MT) function at the wireless device and use of a distributed unit (DU) function; and
    means for scheduling a communication with a child node of the wireless device using the DU function of the wireless device based on whether or not one or more guard symbols are provided for an allocation from a parent node for the MT function, wherein:
    in response to the one or more guard symbols being provided for the allocation from the parent node and a number of the one or more guard symbols being equal to a number of requested guard symbols of the wireless device, the means for scheduling schedules the communication using the DU function without adjustment; and in response to the one or more guard symbols being provided for the allocation from the parent node and the number of the one or more guard symbols being less than the number of requested guard symbols of the wireless device, the means for scheduling schedules the communication using the DU function based on interference conditions.

11. The apparatus of claim 10, wherein the means for scheduling is further configured to select a link having a lower interference level from the allocation from the parent node for the MT function when the one or more guard symbols are not provided by the parent node.

12. The apparatus of claim 10, wherein the means for scheduling the communication using the DU function is further configured to select a beam direction when the one or more guard symbols are not provided by the parent node.

13. The apparatus of claim 10, wherein the means for scheduling the communication using the DU function is further configured to select a communication direction when the one or more guard symbols are not provided by the parent node.

14. An apparatus for wireless communication at a wireless device, comprising:
a memory; and
at least one processor coupled to the memory and configured to:
transition between use of a mobile termination (MT) function at the wireless device and use of a distributed unit (DU) function; and
schedule a communication with a child node of the wireless device using the DU function of the wireless device based on whether or not one or more guard symbols are provided for an allocation from a parent node for the MT function, wherein:
in response to the one or more guard symbols being provided for the allocation from the parent node and a number of the one or more guard symbols being equal to a number of requested guard symbols of the wireless device, the at least one processor schedules the communication using the DU function without adjustment; and
in response to the one or more guard symbols being provided for the allocation from the parent node and the number of the one or more guard symbols being less than the number of requested guard symbols of the wireless device, the at least one processor schedules the communication using the DU function based on interference conditions.

15. The apparatus of claim 14, wherein the at least one processor is further configured to select a link having a lower interference level from the allocation from the parent node for the MT function when the one or more guard symbols are not provided by the parent node.

16. The apparatus of claim 14, wherein the at least one processor is further configured to select a beam direction when the one or more guard symbols are not provided by the parent node.

17. The apparatus of claim 14, wherein the at least one processor is further configured to select a communication direction when the one or more guard symbols are not provided by the parent node.

18. A non-transitory computer-readable medium storing computer executable code for wireless communication at a wireless device comprising a processor, the code being executable by the processor to:
transition between use of a mobile termination (MT) function at the wireless device and use of a distributed unit (DU) function; and
schedule a communication with a child node of the wireless device using the DU function of the wireless device based on whether or not one or more guard symbols are provided for an allocation from a parent node for the MT function, wherein:
in response to the one or more guard symbols being provided for the allocation from the parent node and a number of the one or more guard symbols being equal to a number of requested guard symbols of the wireless device, the wireless device schedules the communication using the DU function without adjustment; and
in response to the one or more guard symbols being provided for the allocation from the parent node and the number of the one or more guard symbols being less than the number of requested guard symbols of the wireless device, the wireless device schedules the communication using the DU function based on interference conditions.

19. The non-transitory computer-readable medium of claim 18, further comprising code to select a link having a lower interference level from the allocation from the parent node for the MT function when the one or more guard symbols are not provided by the parent node.

20. The non-transitory computer-readable medium of claim 18, further comprising code to select a beam direction when the one or more guard symbols are not provided by the parent node.

* * * * *